United States Patent Office 3,562,339
Patented Feb. 9, 1971

3,562,339
PREPARATION OF NITROALKANES FROM VICINAL NITROALKYL NITRATES
John M. Larkin, Wappingers Falls, N.Y., assignor to Texaco Inc., New York, N.Y., a corporation of Delaware
No Drawing. Filed May 29, 1968, Ser. No. 732,886
Int. Cl. C07c 79/04
U.S. Cl. 260—644                                14 Claims

ABSTRACT OF THE DISCLOSURE

A method for preparing 1-nitroalkanes by reacting a vicinal nitroalkyl nitrate corresponding to the formula:

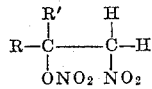

with an alkali borohydride at a temperature of from 30 to 200° F. and subsequently acidifying. In preferred embodiments the vicinal nitroalkyl nitrate is reacted with an alkali borohydride and an alkali agent such as sodium hydroxide and thereafter acidified to provide the desired product. The nitroalkanes so prepared correspond to the formula:

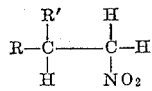

and are useful as plasticizers, gasoline and lubricant additives, herbicides, pesticides and nematocides. Further they are useful as intermediates in the preparation of nitroalcohols, amino alcohols and diamines.

---

This invention relates to a novel method for preparing 1-nitroalkanes from vicinal nitroalkyl nitrates. In particular, this invention relates to a method for preparing nitroalkanes from vicinal nitroalkyl nitrates in a single step reaction.

Heretofore, nitroalkanes were prepared by converting in the presence of an alumina catalyst beta-substituted nitro compounds such as dinitroparaffins, nitroalcohols or nitronitrites to a nitroolefin as exemplified by U.S. Patent 3,240,823. The nitroolefin in turn was catalytically hydrogenated to a 1-nitroalkane by employing palladium catalysts as disclosed in U.S. Patent 3,297,769. One obvious disadvantage in the prior art outlined above was the requirement that a two stage reaction procedure be employed. Moreover, each stage directed that a different catalytic agent be employed thereby making the overall process economically unattractive. In addition, the practice of such a process led to additional difficulties illustrated by the intermediate nitroolefin's unstable characteristics which oftentimes led to undesirable polymerized by-products, particularly when the intermediate was stored for later introduction into the second stage. With regard to the second step of the process, catalytic hydrogenation of nitroolefins oftentimes produced excessive amounts of by-product material such as amines. To control the purity and yield of the ultimately desired product, either closely supervised conditions or expensive purification techniques are called for thereby rendering the process economically impractical.

It is therefore an object of this invention to provide a method for the preparation of 1-nitroalkanes.

Another object of this invention is to provide a method for the preparation of 1-nitroalkanes from nitroalkyl-nitrates in a single step.

Yet another object of this invention is to provide a method for the preparation of 1-nitroalkanes from vicinal nitroalkyl nitrates in high yields.

Other objects and advantages will become apparent from a reading of the following detailed description and examples.

Broadly, this invention contemplates a method for preparing 1-nitroalkanes which comprises:
(a) reacting a vicinal nitroalkyl nitrate corresponding to the formula:

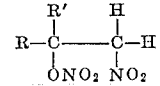

where R and R' are hydrogen or alkyl groups having from 1 to 30 carbon atoms, and preferably having from 1 to 20 carbon atoms, with an alkali borohydride at a temperature of from about 30 to 200° F.; and
(b) acidifying said product of (a).

In highly preferred embodiments, 1-nitroalkanes are prepared by reacting the vicinal nitroalkyl nitrate with an alkali borohydride and an alkali agent, where a portion of the alkali borohydride is replaced with the alkali agent as more fully described below.

The vicinal nitroalkyl nitrates which are reacted with the alkali borohydride or combination of alkali borohydride and alkali agent mentioned above may be prepared by the procedure described in U.S. Pat. 3,282,983. According to this disclosure, an alkene is contacted simultaneously with dinitrogen tetroxide and oxygen at a temperature between −40 and 20° C. to form a nitroalkyl peroxynitrate. The intermediate nitroalkyl peroxynitrate is thereafter contacted with a reducing agent at a temperature of between −20 and 30° C. to form the vicinal nitroalkyl nitrate contemplated herein and corresponds to the above formula.

Examples of vicinal nitroalkyl nitrates contemplated as starting materials in the instant invention include, for example, 1-nitro-2-ethyl nitrate,
1-nitro-2-propyl nitrate,
1-nitro-2,4,4-trimethyl-2-pentyl nitrate,
1-nitro-2-methyl-2-pentyl nitrate,
1-nitro-2-methyl-2-hexyl nitrate,
1-nitro-4-methyl-2-pentyl nitrate,
1-nitro-2-pentyl nitrate,
1-nitro-2-hexyl nitrate,
1-nitro-2-octyl nitrate,
1-nitro-2-dodecyl nitrate,
1-nitro-2-pentadecyl nitrate,
1-nitro-2-octadecyl nitrate, and
1-nitro-2-docosyl nitrate.

Mixtures of vicinal nitroalkyl nitrates are similarly contemplated.

In accordance with this invention, the vicinal nitroalkyl nitrate is reacted with an alkali borohydride in amounts ranging from as low as 0.48 to as high as 10.0, and preferably from 0.6 to 1.0, moles of alkali borohydride per mole of vicinal nitroalkyl nitrate. Contemplated alkali borohydrides include, for example sodium borohydride, potassium borohydride, lithium borohydride, and sodium trimethoxyborohydride, the preferred borohydride being sodium borohydride. In the highly preferred embodiment, a portion of the alkali borohydride is replaced with an alkali agent such that from 0.24 to 5.0 moles of alkali borohydride and from 0.9 to 2.0 moles of an alkali agent are introduced per mole of vicinal nitroalkyl nitrate. Appropriate alkali agents employed in this embodiment include sodium hydroxide, sodium carbonate, sodium bicarbonate, potassium hydroxide, lithium hydroxide, calcium carbonate, sodium hydrogen phosphate and tertiary amines and preferably sodium hydroxide and sodium carbonate. By an alkali agent we mean to include materials capable of neutralizing nitric acid.

The conversion of the vicinal nitroalkyl nitrate employing an alkali borohydride or a combination of the borohydride and alkali agent described above is undertaken at temperatures ranging from 30 to 200° F. and preferably from 60 to 110° F. for periods ranging from 0.5 to 72 hours. While the vicinal nitroalkyl nitrate may itself constitute the reaction medium, we prefer to employ hydrophilic organic mediums exemplified by alcohols, glycols, cyclic ethers such as dioxane and tetrahydrofuran, and amines such as triethanolamine and triethylamine, the latter amines when present performing the dual function of medium and alkali agent. Preferably, the hydrophilic medium is a $C_1$ to $C_4$ alcohol permitting simple separation from the product as by distillation. In addition, the hydrophilic medium may constitute from 1 and up to 90 volume percent of water. Inasmuch as the vicinal nitroalkyl nitrate is not readily soluble in water alone, the medium, when containing water, constitutes at least 10 volume percent of a hydrophilic organic medium specified above such that the nitrate is rendered sufficiently soluble to cause reaction to occur at a reasonable rate.

Subsequent to the contacting of the alkali borohydride or alkali borohydride and alkali agent with the nitronitrate and preferably after the materials have substantially reacted to completion, the product of this reaction is acidified with from about 0.6 to 5.0 moles of acid per mole of alkali borohydride or per mole of alkali borohydride and alkali agent. The acidification of this reaction product may be undertaken utilizing such acids as, for example, hydrochloric acid, nitric acid, acetic acid, sulfuric acid, maleic acid, oxalic acid, succinic acid, phosphoric acid or mellitic acid. When acidifying with a monobasic acid, such as hydrochloric acid, from 2 to 5 moles of acid are employed. In the case of dibasic acids, such as sulfuric acid, 1 to 3 moles of acid are added. In the instance where a tribasic acid, such as phosphoric acid is introduced, I employ from 0.6 to 2 moles. Acidification as described above is undertaken to convert the intermediate product, believed to be an alkali boronitronate or alkali nitronate to the sought after 1-nitroalkane. The product, 1-nitroalkane, is thereafter recovered by employing conventional recovery techniques. In the absence of an added reaction medium, the product may be recovered by simple filtration to separate the alkali salt. When, for example, an alcoholic medium is employed, removal of the salt by filtration followed by distillation of the medium is appropriate. Where water constitutes a portion of the medium, aqueous and non-aqueous layer may be separated by decantation, the aqueous layer carrying along the alkali salts. In this instance, the non-aqueous layer contains the product which may be separated from any organic medium carried along therewith as by distillation.

Specific examples of 1-nitroalkanes prepared according to the instant invention include nitroethane, 1-nitropropane, 1 - nitropentane, 1 - nitro - 4 - methyl-pentane, 1-nitro-2,4,4-trimethylpentane, 1-nitro - 2 - methylhexane, 1-nitrooctane, 1-nitro-2-propyloctane, 1-nitrododecane, 1-nitropentadecane, 1-nitrotetradecane, 1-nitrooctadecane, 1-nitrodocosane and 1-nitro-7-ethyl pentadecane.

The nitroalkanes prepared according to this invention are useful as plasticizers, gasoline and lubricant additives, herbicides, pesticides and nematocides. Further they are useful as intermediates in the preparation of nitroalcohols, amino alcohols and diamines.

In order to more fully illustrate the nature of my invention and the manner of practicing the same the following examples are presented.

EXAMPLE I

To a stirred solution of 11.2 milliliters (0.1 mole) of 1-octene in 55 milliliters of carbon tetrachloride maintained at 0° C. there was simultaneously introduced 6.2 milliliters (0.1 mole) of dinitrogen tetroxide and 60.5 milliliters per minute of oxygen over a period of 6 hours. The colorless solution was flushed with nitrogen and cooled to −10 to −20° C. and while stirring nitric oxide was bubbled in at the rate of 60.5 milliliters per minute for 38 minutes. The resulting blue-green solution was allowed to warm to room temperature and the solvent was subsequently removed under vacuum. A yellow oil weighing 21.62 grams was recovered and identified as 1-nitro-2-octyl nitrate.

To a solution of 1.74 grams of 1-nitro-2-octyl nitrate in 40 milliliters of 95 percent ethanol there was added 1.0 gram of sodium borohydride. The mixture was stirred at room temperature, approximately 72° F., for 19 hours, thereafter diluted with 40 milliliters of water and acidified with approximately 25 ml. of 1.2 N HCl. Subsequently, the mixture was extracted with diethyl ether and washed with 15 milliliters of a saturated sodium chloride solution. The ether extract was evaporated and a yield of 1.19 grams (94 percent) of an oil identified as 1-nitrooctane was obtained.

EXAMPLE II

From 6.3 grams of 4-methyl-1-pentene in 55 milliliters of carbon tetrachloride, there was prepared 12.59 grams of 1-nitro-4-methyl-2-pentyl nitrate by introducing 6.9 grams of dinitrogen tetroxide in a stream of oxygen at 0° C. followed by nitric oxide at −10 to −15° C. according to the procedure of Example I.

To a solution of 2.0 grams of 1-nitro-4-methyl-2-pentyl nitrate in 50 milliliters of 95 percent ethanol there was added 1.25 grams of sodium borohydride. The mixture was stirred at room temperature for 24 hours and thereafter diluted with 100 milliliters of water and acidified to a pH of about 2 with approximately 25 milliliters of 1.2 N HCl. The mixture was subsequently extracted as in Example I with ether, the ether extract evaporated and a yield of 0.98 gram of 1-nitro-4-methylpentane was obtained as a clear colorless liquid. Additional 1-nitro-4-methylpentane is obtained from the aqueous layer by evaporation and filtration of the salts.

EXAMPLE III

To a solution of 5.6 grams (0.05 mole) of 2,4,4-trimethyl-1-pentene in 55 milliliters of carbon tetrachloride maintained at 0° C. there was simultaneously added over a period of 4¾ hours 3.1 milliliters (0.05 mole) of dinitrogen tetroxide and 60.5 milliliters per minute of oxygen. The system was thereafter flushed with nitrogen and the flask contents cooled to approximately −5 to −10° C. Nitric oxide was bubbled through the solution at the rate of 60.5 milliliters per minute for 22 minutes. The resulting blue-green solution was stirred at approximately −10° C. for an additional 15 minutes and the solvent subsequently removed under vacuum at room temperature. 10.79 grams of 1-nitro-2,4,4-trimethyl-2-pentyl nitrate was recovered.

To a solution of 2.0 grams of 1-nitro-2,4,4-trimethyl-2-pentyl nitrate in 50 milliliters of 95 percent ethanol there was added 1.25 grams of sodium borohydride. The mixture was stirred at room temperature, subsequently diluted with 100 milliliters of water, acidified to a pH of 2 by introducing approximately 25 milliliters of 1.2 N HCl and extracted with ether as in Example I. A yield of 1.20 grams (83 percent) of 1-nitro-2,4,4-trimethylpentane was obtained as a yellow oil.

EXAMPLE IV

To 197 grams of 1-tetradecene in 1500 milliliters of heptane at 22° F. there was simultaneously added 92 grams of dinitrogen tetroxide and 48 grams of oxygen over a two-hour period. The solution was purged with nitrogen for 45 minutes and approximately 30 grams of nitric oxide was added during a one-hour period. The solution was allowed to warm to room temperature, the heptane solvent removed by vacuum distillation and 304 grams of 1-nitro-2-tetradecyl nitrate was recovered.

To a solution of 2.0 grams of 1-nitro-2-tetradecyl nitrate in 50 milliliters of 95 percent ethanol there was added 1.0 gram of sodium borohydride. The solution was allowed to stand for 25 hours, subsequently diluted with 100 milliliters of water, acidified with approximately 25 milliliters of 1 N HCl and extracted with ether as in the previous examples. The ether extract was washed with a saturated sodium chloride solution, and the ether subsequently removed by evaporation. A yield of 1.60 grams of 1-nitrotetradecane was obtained.

EXAMPLE V

To a stirred solution of 0.04 mole of 1-nitro-2-methyl-2-pentyl nitrate in 50 milliliters of 95 percent ethanol at 75° F. there is added dropwise over a 2 hour period a solution of 0.04 mole of sodium hydroxide and 0.012 mole of sodium borohydride in 50 milliliters of water. Stirring at room temperature is continued for an additional 10 hours and the mixture is acidified slowly with 25 milliliters of 1.2 N sulfuric acid yielding 1-nitro-2-methyl pentane.

EXAMPLE VI

To a stirred solution of 0.04 mole of 1-nitro-2-pentyl nitrate in 50 milliliters of 95 percent ethanol at 60° F. there is added 0.04 mole of lithium borohydride during a half-hour period. The mixture is stirred at 60–65° F. for 10 hours and subsequently diluted with 50 milliliters of water. The resultant solution is acidified by the slow addition of 25 ml. of 1 N phosphoric acid yielding 1-nitropentane.

EXAMPLE VII

To a stirred solution of 0.04 mole of 1-nitro-2-pentyl nitrate in 50 milliliters of 95 percent ethanol at 60° F. there is added 0.04 mole of potassium borohydride during a half-hour period. The mixture is stirred at 60–65° F. for 10 hours and subsequently diluted with 50 milliliters of water. The resultant solution is acidified by the slow addition of 25 ml. of 1 N phosphoric acid yielding 1-nitropentane.

I claim:
1. A method for preparing 1-nitroalkanes which comprises:
(a) reacting a vicinal nitroalkyl nitrate corresponding to the formula:

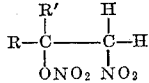

where R and R' are hydrogen or alkyl groups having from 1 to 30 carbon atoms, with an alkali borohydride at a temperature of from about 30 to 200° F.; and
(b) acidifying said product of (a).

2. A method according to claim 1 wherein said reacting in (a) is undertaken employing a mole ratio of said alkali borohydride to said nitroalkyl nitrate of from 0.48:1 to 10.0:1.

3. A method according to claim 1 wherein said reacting in (a) is undertaken employing a mole ratio of said alkali borohydride to said nitroalkyl nitrate of from 0.6:1 to 1:1.

4. A method according to claim 1 wherein said acidifying in (b) is undertaken by adding acid in a mole ratio of said acid to said alkali borohydride of from 0.6:1 to 5:1.

5. A method according to claim 1 wherein said reacting in (a) is conducted at a temperature of from 60 to 110° F.

6. A method according to claim 1 wherein said alkali borohydride is sodium borohydride.

7. A method according to claim 1 wherein said alkali borohydride is potassium borohydride.

8. A method according to claim 1 wherein said alkali borohydride is lithium borohydride.

9. A method according to claim 1 wherein said acid is hydrochloric acid.

10. A method according to claim 1 wherein said acid is sulfuric acid.

11. A method according to claim 1 wherein said reaction in (a) is conducted in a hydrophilic medium.

12. A method for preparing 1-nitroalkanes which comprises:
(a) reacting a vicinal nitroalkyl nitrate corresponding to the formula:

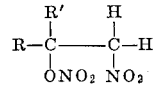

where R and R' are hydrogen or alkyl group having from 1 to 30 carbon atoms with an alkali borohydride and an alkali agent at a temperature of from about 30 to 200° F. in a mole ratio of said alkali borohydride to said nitroalkyl nitrate of from 0.24:1 and 5.0:1 and in a mole ratio of said alkali agent to said nitroalkyl nitrate of from 0.9:1 and 2.0:1; and
(b) acidifying said product of (a) by adding from 0.6 to 5.0 moles of an acid per mole of said alkali borohydride and said alkali agent.

13. A method according to claim 12 wherein said alkali agent is sodium hydroxide.

14. A method according to claim 12 wherein said alkali agent is sodium carbonate.

References Cited

Astle, Industrial Organic Nitrogen Compounds, Reinhold Pub. Corp., New York, 1961, pp. 345 to 356.

Boschan et al., Chem. Reviews, vol. 55, pp. 502 to 505 (1955).

LELAND A. SEBASTIAN, Primary Examiner

U.S. Cl. X.R.
260—647